United States Patent [19]

Keedy

[11] Patent Number: 5,105,191
[45] Date of Patent: Apr. 14, 1992

[54] APPARATUS AND METHOD FOR DETECTING AND INDICATING WEATHER CONDITIONS FOR AIRCRAFT

[75] Inventor: Edgar L. Keedy, Liberty Center, Ohio

[73] Assignee: Artais Development, Inc., Columbus, Ohio

[21] Appl. No.: 436,259

[22] Filed: Nov. 13, 1989

[51] Int. Cl.$^5$ ............................................. G08B 23/00
[52] U.S. Cl. ..................................... 340/968; 73/189; 340/949; 364/434
[58] Field of Search ....................... 340/968, 963, 949; 342/26, 53; 374/112; 364/434; 73/178 T, 189; 244/31, 114 R, 182

[56] References Cited

U.S. PATENT DOCUMENTS

| | | | |
|---|---|---|---|
| 3,573,824 | 4/1971 | Framingham et al. | 342/26 |
| 3,935,460 | 1/1976 | Flint | 374/112 |
| 4,058,010 | 11/1977 | Woodhouse | 73/189 |
| 4,137,764 | 2/1979 | Hallock et al. | 73/189 |
| 4,163,216 | 7/1979 | Arpino . | |
| 4,295,139 | 10/1981 | Arpino . | |
| 4,346,595 | 8/1982 | Gary | 342/26 |
| 4,593,285 | 6/1986 | Miller et al. | 340/968 |
| 4,712,108 | 12/1987 | Schwab | 73/189 |
| 4,812,844 | 3/1989 | Kallstrom | 340/968 |
| 4,947,165 | 8/1990 | Zweifel | 340/968 |

OTHER PUBLICATIONS

"The Federal Triangle", Washington Post, Oct. 17, 1983, FAA Plans to Buy Wind-Shear Alert Devices.
Artais, Inc., *AWOS Automated Weather Observing System*, six pages, 1989.

Primary Examiner—Jin F. Ng
Assistant Examiner—Brent A. Swarthout
Attorney, Agent, or Firm—Marshall & Melhorn

[57] ABSTRACT

An apparatus and a method for detecting and indicating severe weather conditions such as wind shear and clear air turbulence includes a sensor for detecting the weather parameter of air temperature differential and a computer for comparing the parameter value with a stored constant value. The sensor can be an infrared scanner in an aircraft or on the ground. When the parameter value exceeds the constant value, a severe weather condition warning indication is generated by the computer as a visual and/or audio signal. The method and apparatus can also include sensor modules for detecting wind speed and direction, barometric pressure and air temperature to be compared by the computer. A steam generator can generate steam bubbles for detecting winds aloft with the infrared scanner or weather radar.

10 Claims, 3 Drawing Sheets

APPARATUS AND METHOD FOR DETECTING AND INDICATING WEATHER CONDITIONS FOR AIRCRAFT

BACKGROUND OF THE INVENTION

The present invention relates generally to an aircraft weather information system and, in particular, to an apparatus and method for detecting and indicating severe weather conditions in real time.

One of the problems associated with either the landing at, or the taking off from, an airport which is not manned is the lack of pertinent and up-to-date information on the conditions at the airport. Such information includes real time weather information and other information which can be exclusive to particular airports.

When an aircraft approaches an airport for a landing, the pilot must know both the wind direction and the wind speed if he is to land safely. If the airport is uncontrolled, the pilot must first fly over the airport and observe the windsock to make a judgment as to the present wind direction. However, this is very wasteful as it often takes up to ten minutes of extra flying time to perform this maneuver. Also, this maneuver can be quite dangerous in the event of a low overcast.

In the landing of a jet aircraft, the present outside temperature should also be available to the pilot. A jet aircraft takes off and lands by its indicated air speed which is determined by the weight of the aircraft and the outside temperature. If the pilot is not informed of the present outside temperature, he must estimate this temperature in order to determine the indicated air speed of the aircraft. A miscalculation of the indicated air speed can result in a jet aircraft using a larger portion of the runway than is necessary. Thus, if the pilot of a jet aircraft is informed of the present outside temperature, he can determine the correct indicated air speed for landing and consequently use less runway and fuel.

One apparatus for providing an aircraft with weather information has been disclosed in U.S. Pat. No. 3,949,399. A weather transducer is connected to a recording system such that, when the pilot generates the appropriate control signal to the system, the weather information is transmitted to the pilot in speech form. However, this apparatus is not capable of analyzing the signals from the weather transducer to provide the pilot with information such as the variation in wind direction or the speed of the wind gusts.

The problem of obtaining real time weather information was solved by a system and method for transmitting airport weather information disclosed in U.S. Pat. No. 4,163,216 and in U.S. Pat. No. 4,295,139. The weather information is transmitted in speech form to the pilot of an aircraft. The method can also provide the pilot with other information which can be considered pertinent to either the landing or the taking off of the aircraft. The radio telephone equipment normally found on board the aircraft can be used to activate an information transmitter or the transmitter can be continuously or manually activated.

A system for implementing the above-identified method includes a microcomputer which is used to read and analyze data received from a group of weather sensors. The microcomputer analyzes data received from a wind direction sensor over a last predetermined time interval to determine a most prominent wind direction and a most prominent wind variation in wind direction. Data received from a wind speed sensor is analyzed in a similar manner to determine a most prominent wind speed and a most prominent wind gust. The wind information is then further classified into such categories as "calm" or "light and variable". Other weather information which can be transmitted to the aircraft includes barometric pressure and temperature. When the system transmitter is activated, the microcomputer individually addresses locations of a voice storage means to generate a message which is then transmitted to the aircraft.

A significant problem at both manned and unmanned airports is obtaining information with respect to rapid changes in the weather parameters. One condition brought about by rapid weather changes is a microburst or wind shear. In its most dangerous form, wind shear is manifested by an area of strong down draft winds which can severely interfere with an aircraft which is close to the ground such as during landing and takeoff. However, wind shear is accompanied by rapid and significant changes in weather conditions such as wind direction, wind speed, barometric pressure and air temperature. Currently, a Low Level Wind Shear Alert System (LLWSAS), which was developed by the Federal Aviation Administration, has been deployed at many airports. However, this system senses wind direction and wind speed only and then computes wind differences to identify those differences which are associated with fronts and microbursts in the immediate airport area.

Another condition brought about by rapid weather changes is clear air turbulence. An airplane flying into clear air turbulence can experience rapid changes in speed, direction and altitude which changes are dangerous to the safety of the airplane and its passengers and crew.

It is an object of the present invention to facilitate the take off and landing of an aircraft at an airport.

It is another object of the present invention to provide real time weather information to airport personnel and the pilot and/or crew of an aircraft.

It is a further object of the present invention to provide warning of clear air turbulence and/or microburst and/or wind shear conditions.

SUMMARY OF THE INVENTION

The present invention concerns an apparatus and method for detecting and indicating severe weather conditions to aircraft. The above objects, as well as others, may typically be achieved by a method wherein a signal representing a value of a weather condition parameter is generated, a comparison is made between the parameter value and a constant value associated with a severe weather condition, and a signal representing a severe weather condition warning is generated. Depending upon the type of weather condition to be detected, a plurality of different weather parameters may be sensed and compared with various constants to indicate the selected severe weather condition. For example, microbursts or wind shear are associated with rapid and large changes in wind speed, wind direction, barometric pressure and air temperature. An infrared detector can be used on the ground or in an aircraft to detect temperature differences associated with clear air turbulence or wind shear and provide a warning to the pilot indicating direction and distance.

On the ground, the above-described method and apparatus can be used with a plurality of sensors for wind speed and direction, barometric pressure and air temperature. The sensors can be positioned adjacent the runway and in the area surrounding the airport to detect microbursts or wind shear and indicate location and movement of the severe weather. A steam generator can be used to release steam bubbles into the atmosphere which bubbles can be detected by the infrared scanning device for indicating the speed and direction of winds aloft.

The above-described method can be practiced with an apparatus according to the present invention. This apparatus includes a programmed computer which is connected to the various sensors including the infrared scanner. Weather parameter values generated by the sensors are read by the computer and stored in memory. The parameter values are compared with previously stored constant values to determine changes in the parameter values which represent the presence of selected severe weather conditions. Upon detection, the computer generates a warning signal which indicates audibly and/or visually the weather condition and its location. In one embodiment, a graphic visual display of the geographic area and the location of the severe weather can be generated on a video display monitor.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
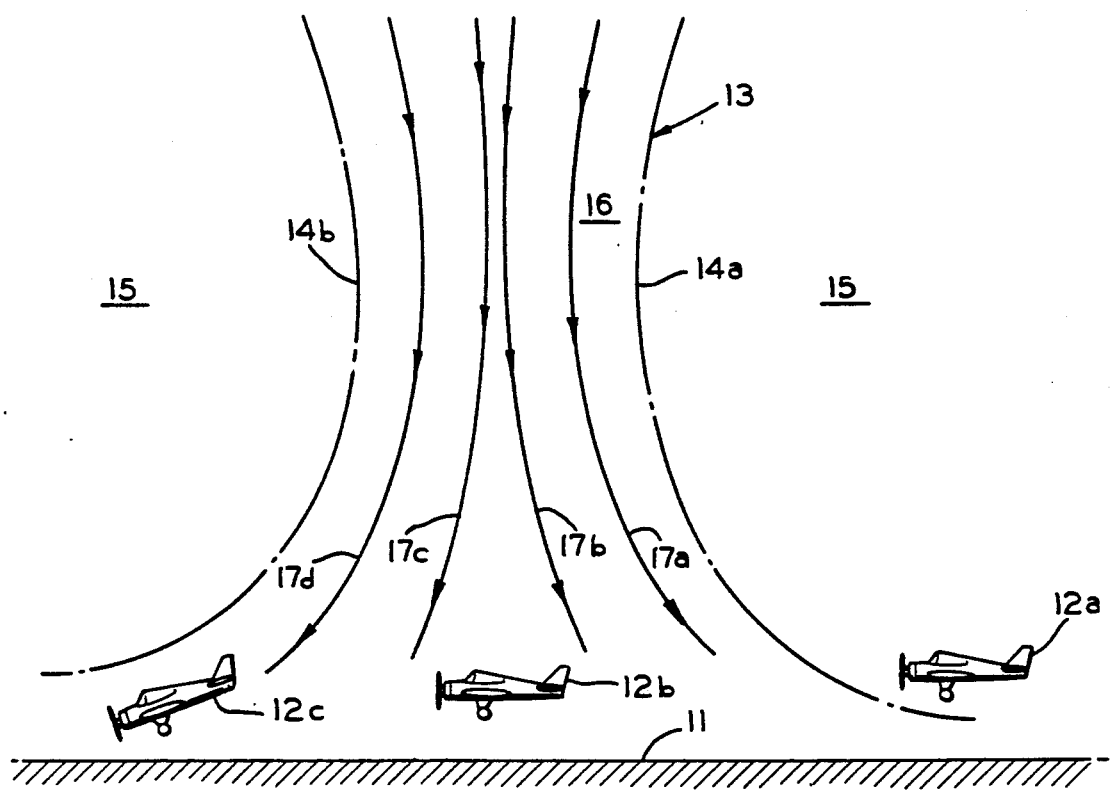
FIG. 1 is a schematic view of a airplane landing on a runway and a wind shear condition to be detected by the present invention.

In FIG. 1 there is shown a portion of an airport runway 11 upon which an airplane (positions 12a through 12c) is about to land. Also depicted is a microburst or wind shear 13 in the form of a down draft having boundaries 14a and 14b separating air 15 in the area of the runway 11 from air 16 forming the down draft 13.

When the airplane is at the position 12a, it is on a normal approach to the runway 11 at a proper speed and height in accordance with the wind direction and speed prevailing in the atmosphere 15. The air 16 in the down draft 13 is represented by lines 17a through 17d having arrowheads showing the direction of the wind.

As the airplane enters the closer boundary 14a, it encounters a change in wind speed and direction which is in the form of a head wind 17a. Thus, the forward speed of the airplane is slowed. As the airplane progresses through the wind shear 13, it enters a central region, as depicted by the airplane position 12b, where it encounters substantially downwardly directed winds 17b and 17c which tend to force the airplane toward the surface of the runway 11. The airplane has now lost forward speed and altitude with respect to the values of forward speed and altitude which were required for a proper landing path through the air 15.

As the airplane approaches the position 12c at the boundary 14b, it encounters a tail wind 17d in a downward direction. The tail wind, combined with the loss of air speed and loss of altitude, tends to cause the airplane to crash into the runway 11.

Figure 2:
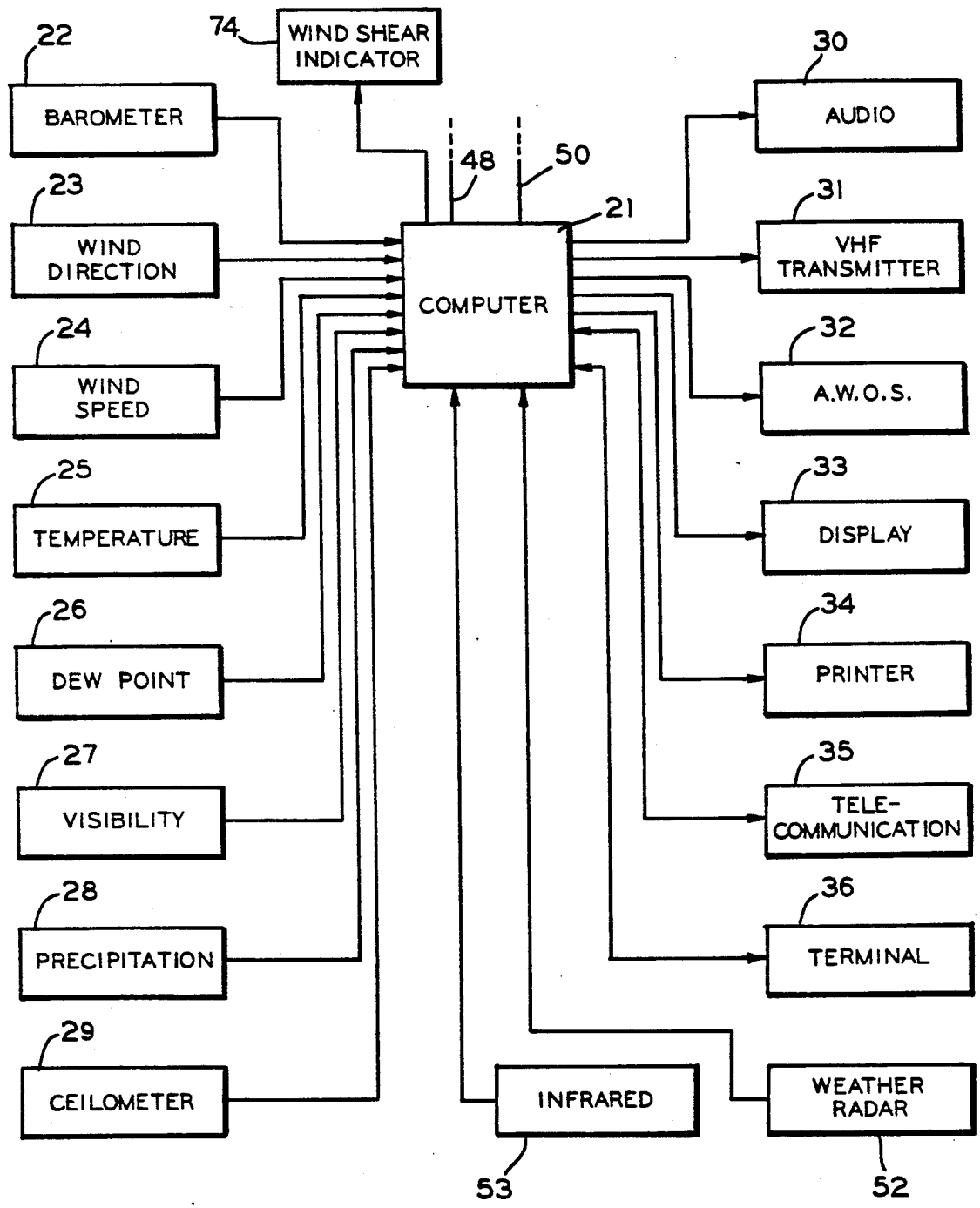
FIG. 2 is schematic block diagram of an apparatus in accordance with the present invention.

A system for detecting and transmitting weather information including the wind shear condition 13 is shown in FIG. 2. Selected weather parameters are detected by a plurality of sensors which are connected to a computer 21. The computer 21 and the sensors can be the same as, or similar to, the devices disclosed in U.S. Pat. No. 4,163,216 and U.S. Pat. No. 4,295,139, which patents are incorporated herein by reference. Sensors include a barometer sensor 22, a wind direction sensor 23, a wind speed sensor 24, a temperature sensor 25, a dew point sensor 26, a visibility sensor 27, a precipitation sensor 28, and a ceilimeter sensor 29. All of the sensors 22 through 29 generate weather condition parameter values as suitable instantaneous signals to inputs to the computer 21.

The computer 21 utilizes the instantaneous parameter values to generate real time weather information to various output devices which are connected to the computer. The computer 21 can generate a synthesized voice which can be transmitted to an audio receiver 30 such as the typical radio telephone equipment installed in aircraft. The synthesized voice can also be transmitted by a VHF transmitter 31 on a frequency specifically assigned for such purpose. The weather information can also be transmitted to an A.W.0.S. (Automated Weather Observing System) to generate automated weather reports in a standard format that is familiar to pilots. The voice reports can be broadcast ground-to-air using a local NAVAID, such as an NDB, VOR or its own discreet VHF frequency. Pilots can get the latest weather report for preflight planning via a direct-dial telephone from anywhere in the world. The operators of an A.W.0.S. system can add a personalized message to the system generated weather report such as NOTAM, a weather remark or a special note about the airport.

The computer 21 can send the weather information to a visual display 33 such as a video monitor. The weather information can also be sent by the computer 21 to a printer 34 which could be located in the control tower or a pilot briefing room. The weather information is also available by telecommunication equipment 35 and the same line can be used to program added messages into the computer or for remote monitoring and maintenance of the system. The computer 21 can also be connected to a computer terminal 36 for the exchange of information. The computer 21, the sensors 22 through 29 and the input and output devices 30 through 36 are commercially available from Artais Weather-Check, Inc. 4660 Kenny Road. Columbus, Ohio 43220.

Figure 3:
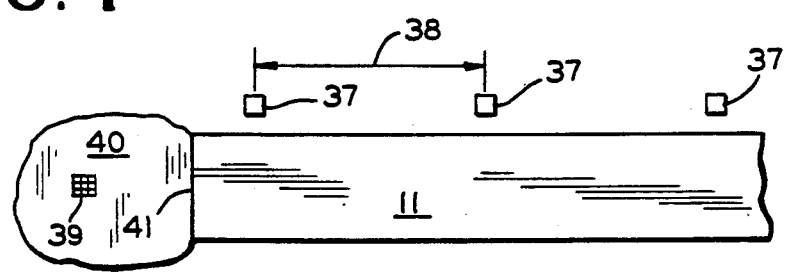
FIG. 3 is a schematic plan view of an airport runway and several of the sensors shown in FIG. 2.

Signals from the barometer sensor 22, the wind direction sensor 23, the wind speed sensor 24 and the temperature sensor 25 are useful for detecting microbursts or wind shear. The sensors can be packaged together in a sensor module 37 which then can be located alongside the runway 11 as shown in FIG. 3. A plurality of the modules 37 can be placed at the side of the runway 11 and spaced apart a predetermined distance 38 such as, for example, two hundred feet. In addition, the modules 37 can be installed along the landing approaches and take off paths at the ends of the runways spaced, for example, every one half mile for approximately ten miles. Any suitable form of data transmission including land lines and electromagnetic signals can be utilized to connect the sensor modules 37 to the computer 21 for signal transmission.

Figure 4:
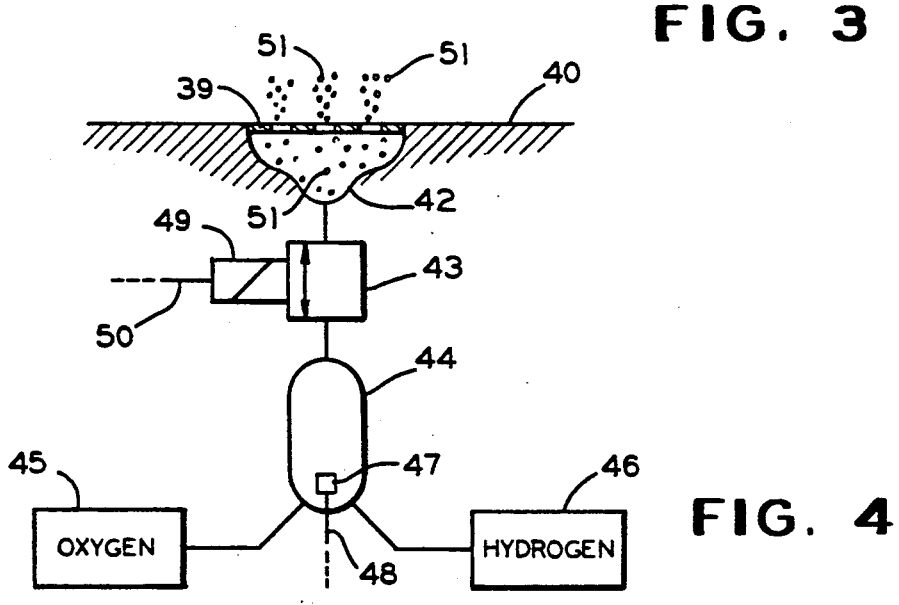
FIG. 4 is a schematic representation of a steam generator for use with the apparatus as shown in FIG. 2.

In addition, an instantaneous steam generating device can be installed at each end of each of the runways. As shown in FIGS. 3 and 4, a grate 39 is installed at ground level 40 at an end 41 of the runway 11. Referring to FIG. 4, the grate 39 covers the opening of an upwardly facing generally cup-shaped chamber 42 which is installed below ground level. The chamber 42 is connected through a normally closed valve 43 to a steam generation tank 44. The tank 44 is connected to an oxygen reservoir 45 and to a hydrogen reservoir 46. A suitable ignition device 47 is located inside the tank and can be, for example, an electric arc ignitor. The actuation of the ignitor 47 is controlled by a signal received on a line 48 connected to the computer 21 shown in FIG. 2. The valve 43 can be operated by any suitable means such as the internal pressure in the tank 44 or a solenoid 49 which is actuated by a signal on a line 50 connected to the computer 21 shown in FIG. 2.

When the computer 21 senses selected severe weather conditions, as reported by the sensors located in and around the airport, an actuation signal can be sent on a line 48 to actuate the ignitor 47 and generate steam in the tank 44. The computer 21 then periodically sends an actuation signal on the line 50 to open the valve 43 and allow the steam to escape from the tank 44 into the chamber 42 and rise through the grate 39 into the atmosphere above the ground 40. As steam bubbles 51 rise into the air, such bubbles will move with the wind across the ground thereby indicating wind speed and wind direction in areas where the sensor modules 37 may not be located and at altitudes above the sensor modules 37.

The steam bubbles can be tracked and the speed and direction information for winds aloft generated by a weather radar 52 (FIG. 2) which is connected to input such parameter values into the computer 21. Since the steam bubbles are at a higher temperature than the surrounding air, they also can be tracked by an infrared scanner 53 (FIG. 2) which is connected for generating these parameter values to the computer 21. The steam generator can be operated automatically by the computer 21 in response to a predetermined set of weather conditions, or by manual actuation through the terminal 36 by the tower operator or other operating personnel. As stated above, the valve 43 could also be actuated at a predetermined steam pressure in the tank 44 to operate automatically once the steam is being generated.

The infrared scanner 53 also can be utilized with the weather radar 52 to detect the severe weather conditions. There is a substantial and detectable difference between the temperature of the air 15 outside the boundaries 14a and 14b and the temperature of the air 16 inside those boundaries. The weather radar can locate storms and the infrared scanner can detect that temperature difference and generate additional information to the computer such as distance to, direction of, speed of movement of, direction of movement of and area size of the temperature differential air 16. If the infrared scanner is installed in an aircraft, it also can detect other aircraft in the area.

Figure 5:
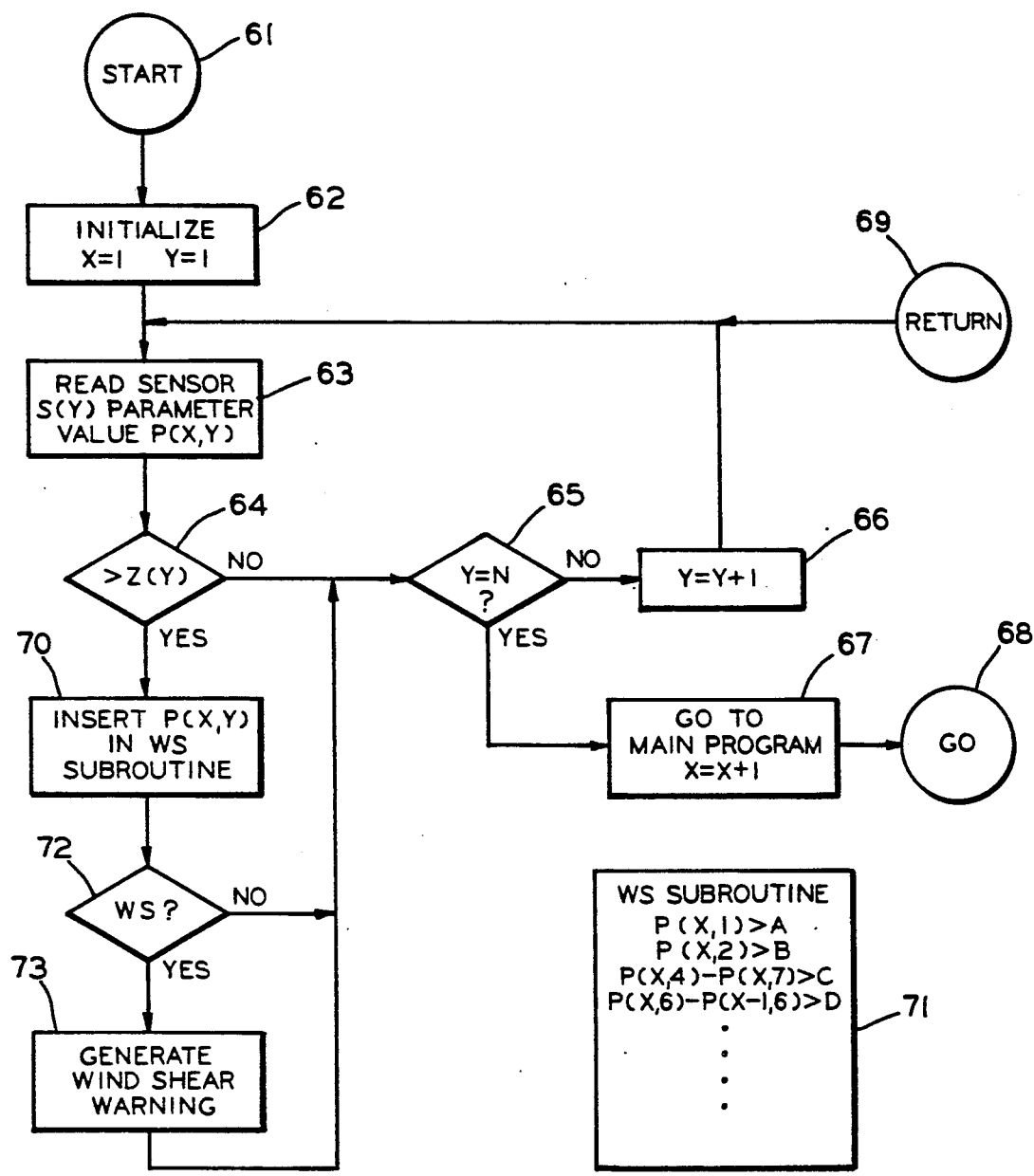
FIG. 5 is a flow diagram of a program for identifying and displaying severe weather conditions for use with the apparatus shown in FIG. 2.

There is shown in FIG. 5 a flow diagram of a computer program for use with the apparatus shown in FIG. 2. As stated above, the Artais Weather-Check weather information system includes software for collecting weather parameter data from the various sensors, converting that data to real time data and transmitting the real time data to one or more of various output devices. The severe weather detection function can be multiplexed within the various functions performed by the Artais system. The Artais system is typically programmed to read all of the sensors in a predetermined sequence which can be called a "reading cycle". The program shown in FIG. 5 can be run after each reading cycle or after a predetermined number of reading cycles have been performed, as necessary for detecting and warning of severe weather conditions.

At the end of an Artais system reading cycle, the program shown in FIG. 5 starts at a circle 61 and executes an instruction set 62 whereupon an "X" counter and a "Y" counter are both set to the value one. The program enters an instruction set 63 for reading the value of the parameter associated with a sensor S(Y) which can be any of the sensors 22 through 29, the weather radar 52 or the infrared scanner 53. This weather condition parameter had previously been stored in the computer memory by the Artais system and has a parameter value P(X,Y). The program enters a decision point 64 to determine whether the parameter value P(X,Y) exceeds an associated constant value Z(Y) which also was previously stored in the computer memory. In the case of some parameters, for example wind speed, the parameter value P(X,Y) is compared directly with the constant value Z(Y) since a microburst or wind shear may be associated with a wind speed equal to or greater than a selected value. In other cases, the constant value Z(Y) represents a change in the parameter value such that it is compared with the absolute value of P(X,Y)−P(X−1,Y), the difference between the current parameter value and the value of the same parameter during the previous reading cycle. For example, a large change in the value of the air temperature could be associated with a wind shear condition.

If the constant value Z(Y) is not exceeded, the program branches from the decision point 64 at "NO" and enters a decision point 65 wherein the current value of the "Y" counter is compared to a value "N" which represents the maximum number of sensors to be read. If the current value of the "Y" counter is not equal to the maximum value "N", the program branches at "NO" to an instruction set 66 wherein the value of the "Y" counter is incremented by one. The program returns to the instruction set 63 to repeat the process for the next sensor.

If the last sensor has been checked, the program branches from the decision point 65 at "YES" and enters an instruction set 67. The value of the "X" counter is incremented by one representing the next reading cycle and the wind shear program is exited at a circle 68 back to the Artais main program. When the next reading cycle, or a predetermined number of reading cycles, is completed in the main program, the Artais system returns at a circle 69 and the instruction set 63 is entered again.

If the constant value Z(Y) is exceeded by the parameter value, the decision point 64 is exited at "YES" and an instruction set 70 is entered. The parameter value P(X,Y) is inserted into a wind shear subroutine which evaluates all of the parameters of interest to determine whether a wind shear condition exists. The WS (wind shear) subroutine is shown in a box 71. The parameter values of interest are compared against associated constant values. For example, the parameter value P(X,1) is compared against a constant value "A" and the parameter value P(X,2) is compared against the constant value "B". The difference between two different parameter values can be compared against a constant value as shown where the parameter value P(X,4)−P(X,7) is compared against the constant value "C". In other instances, the difference between the current value and the previous value of the same parameter is compared as shown where P(X,6)−P(X−1,6) is compared with the constant value "D". The WS subroutine is representative of a method for detecting any type of severe weather condition by comparing a selected set of weather condition parameter values with associated constant values.

The program enters a decision point 72 wherein a check is made as to whether all conditions have been met and it has been determined that a wind shear condition is present. If no wind shear has been detected, the program branches at "NO" to the decision point 65. If wind shear has been detected, the program branches at "YES" to an instruction set 73 wherein a wind shear warning is generated. The instruction set 73 instructs the computer 21 to generate a warning signal to a wind shear indicator 74 shown in FIG. 2. This indicator can be visual and/or audio. This indicator can be located in the control tower and the warning can be transmitted automatically to an approaching aircraft via the audio transmitter 30 and/or the VHF transmitter 31. After the instruction set 73, the program enters the decision point 65.

Figure 6:
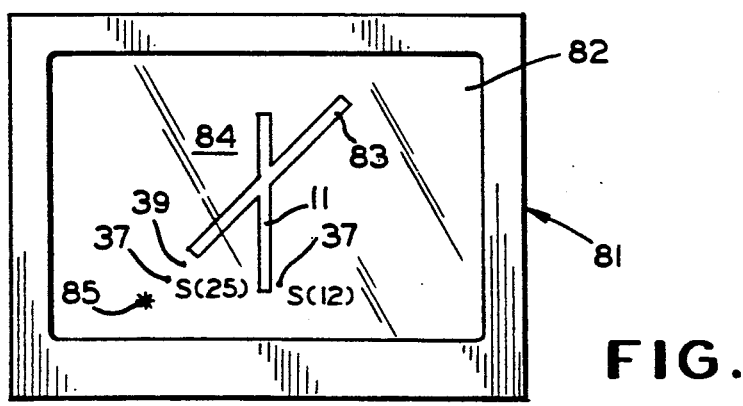
FIG. 6 is a schematic representation of a severe weather condition graphic display generated by the apparatus shown in FIG. 2.

The computer 21 of FIG. 2 can also generate a representation of the location of the severe weather condition on a graphic representation of a map of the airport and surrounding land. There is shown in FIG. 6 a video display monitor 81 which can be the display 33 or the indicator 74 of FIG. 2, or a separate component connected to the computer 21. A screen 82 of the monitor 81 displays a graphic representation of the runway 11 and an intersecting runway 83 together with surrounding land 84. The location of each of the sensor modules 37 can also be indicated such as a sensor S(12) located adjacent the runway 11 and a sensor S(25) spaced from the end of the runway 83. The location of the steam generators can also be indicated with, for example, a symbol for the grate 39. When a severe weather condition is detected, its location with respect to a reference point such as a sensor module 37 can be depicted by any suitable symbol 85. Depending upon the size of the weather condition and the spacing between the sensor modules 37, one or more of the symbols 85 can be generated.

The present invention concerns an apparatus and a method for detecting and indicating selected severe weather conditions. The apparatus includes at least one source of signals for weather parameters such as wind speed, wind direction, air temperature and barometric pressure; means connected to said source for reading and storing said weather parameter signals during successive reading cycles; means connected to said means for reading and storing for comparing said weather parameter signals from the most recent of said reading cycles with associated constant values; and means connected to said means for comparing for identifying each of said weather parameter signals which exceeds in value its said associated constant value and for generating a severe weather condition signal when a predetermined number of said weather parameter signals are identified. The method includes the steps of selecting a weather condition parameter representative of the severe weather condition to be detected; storing an associated constant value; cyclically sensing said selected parameter and storing a parameter value for each cycle; comparing each said parameter value with said constant value; repeating the above-described steps for any additional weather condition parameters required to identify the selected severe weather condition; and generating a severe weather condition warning when the value of each of said weather condition parameters has exceeded its associated constant value.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for detecting and indicating a severe weather condition comprising:
   at least one source of signals for each of the weather parameters wind speed, wind direction, air temperature and barometric pressure;
   means connected to said one source for reading and storing said weather parameter signals during successive reading cycles;
   means connected to said means for reading and storing for comparing values of said weather parameter signals from the most recent of said reading cycles with associated constant values wherein said means for comparing is a programmed computer which compares a difference between the value of one of said weather parameter signals and a successive value of said one of said weather parameter signals with an associated constant value; and
   means connected to said means for comparing for identifying each of said weather parameter signals having a value in one of said reading cycles which exceeds in value its said associated constant value and for identifying each of said weather parameter signals having a value of said difference which exceeds in value its said associated constant value and for generating a severe weather condition signal when a predetermined number of said weather parameter signals are identified.

2. The apparatus according to claim 1 wherein said means for reading and storing is a programmed computer and said weather parameter signals represent instantaneous values of the associated parameters.

3. The apparatus according to claim 1 wherein said means for reading and storing is a programmed computer and said weather parameter signals represent real time values of the associated parameters.

4. The apparatus according to claim 1 wherein said means for comparing is a programmed computer which compares a difference between the value of one of said weather parameter signals and a value of said one weather parameter signal during a previous one of said reading cycles with said associated constant value.

5. The apparatus according to claim 1 including an infrared scanning means connected to said means for reading and storing for generating an air temperature differential signal representing a temperature differential at a boundary of severe weather detected by said infrared scanning means as one of said weather parameter signals.

6. The apparatus according to claim 1 including means connected to said means for identifying and responsive to said severe weather condition signal for generating a severe weather condition indication.

7. The apparatus according to claim 6 wherein said means for generating generates an audible severe weather condition indication.

8. The apparatus according to claim 6 wherein said means for generating generates a visual severe weather condition indication.

9. The apparatus according to claim 6 wherein said means for generating includes a video display having a screen upon which is generated a graphic representation of an area surrounding said source of weather parameter signals and an indication of the location of the severe weather condition.

10. An apparatus for detecting and indicating wind shear comprising:
a source of a signal representing a weather parameter indicative of a wind shear condition;
means connected to said source for reading and storing said weather parameter signal during successive reading cycles;
means connected to said means for reading and storing for comparing a value of said weather parameter signal from the most recent of said reading cycles with an associated constant value; and
means connected to said means for comparing for generating a wind shear condition signal when said weather parameter signal value exceeds said associated constant value wherein said source is an infrared scanner means and including a steam generator for generating steam bubbles, and wherein said weather parameter is wind speed and direction of winds aloft as indicated by said steam bubbles being detected by said infrared scanning means.

* * * * *